United States Patent
Raes et al.

[11] Patent Number: 6,015,174
[45] Date of Patent: Jan. 18, 2000

[54] UNIVERSAL END EFFECTOR FOR ROBOTIC APPLICATIONS

[75] Inventors: Camiel J. Raes, Phelps; Joseph E. Stagnitto, Rochester; James A. White, Conesus, all of N.Y.

[73] Assignee: Eastman Kodak Company, Rochester, N.Y.

[21] Appl. No.: 09/090,828

[22] Filed: Jun. 4, 1998

[51] Int. Cl.[7] .................... B25J 15/06; B25J 19/02
[52] U.S. Cl. ............... 294/2; 294/64.1; 294/119.1; 294/907; 901/40; 901/46
[58] Field of Search ................ 294/2, 64.1, 65, 294/86.4, 99.1, 119.1, 902, 907; 414/737, 752; 901/31–33, 39, 40, 46

[56] References Cited

U.S. PATENT DOCUMENTS

| | | |
|---|---|---|
| 3,648,853 | 3/1972 | Winne . |
| 4,451,197 | 5/1984 | Lange ...................................... 414/737 |
| 4,637,736 | 1/1987 | Andeen et al. ........................... 374/45 |
| 4,655,673 | 4/1987 | Hawkes .................................... 414/730 |
| 4,657,470 | 4/1987 | Clarke et al. ........................... 414/627 |
| 4,662,668 | 5/1987 | Hufford .................................. 294/64.1 |
| 4,750,768 | 6/1988 | Kumar .................................... 294/64.1 |
| 4,799,854 | 1/1989 | Niskala .................................... 414/737 |
| 4,806,070 | 2/1989 | Poux et al. ............................... 414/752 |
| 5,050,919 | 9/1991 | Yakou ........................................ 294/2 |
| 5,064,234 | 11/1991 | Marozsan et al. ...................... 294/64.1 |
| 5,102,114 | 4/1992 | Suda ........................................... 271/18 |
| 5,207,467 | 5/1993 | Smith ..................................... 294/64.1 |
| 5,308,132 | 5/1994 | Kirby et al. ............................ 294/64.1 |
| 5,575,376 | 11/1996 | Colamussi ................................. 294/65 |
| 5,671,962 | 9/1997 | Otsuka et al. ........................ 294/119.1 |
| 5,765,890 | 6/1998 | Gaylord et al. ............................ 294/65 |
| 5,884,951 | 3/1999 | Long et al. ............................. 294/64.1 |

*Primary Examiner*—Dean J. Kramer
*Attorney, Agent, or Firm*—Mark G. Bocchetti

[57] ABSTRACT

An end effector system adapted to be used for robotic tooling applications which allows the end effector to be used to acquire parts by vacuum pick-up or grasping. A vacuum type end effector is provided at the end of each of two robotic tooling fingers. Each vacuum type end effector includes a flexible bellows member on the end thereof such that it can be used for vacuum acquisition. Extending down from each finger to reside adjacent a respective bellows is a pinch member. Through robotic control of the movement of the fingers, finger gripping can be accomplished to grip an object between the two bellows using the pinch members for lateral support. As the part is captured between the two bellows, each bellows is compressed against its respective pinch member. In such manner, the bellows are at least partially collapsed such that a vacuum sensor located in the vacuum supply line to the bellows registers that a vacuum is present and, thus, a part has been acquired. That same vacuum sensor allows the robot to know when a part has been acquired by the bellows in the typical vacuum-type pick-up arrangement.

11 Claims, 3 Drawing Sheets

UNIVERSAL END EFFECTOR FOR ROBOTIC APPLICATIONS

FIELD OF THE INVENTION

The present invention relates generally to parts acquisition tooling for robotic arms and, more particularly, to end effectors and systems for robotic tooling application.

BACKGROUND OF THE INVENTION

In automated assembly systems devices are used for holding and placing components or parts to accomplish the manufacture of finished or intermediate products. These automated assembly systems ideally employ as much robotic operation as possible in order to minimize or eliminate the need for manual intervention. Parts or components in such systems are typically acquired by the robot in one of two ways. The first way is to use an end effector which acquires a particular part by vacuum acquisition wherein a bellows or open ended tube engages a surface of the part and the vacuum is drawn through the bellows or tube to thereby hold the part to the bellows or the open ended tube. An example of an open ended tube device is shown in U.S. Pat. No. 5,308,132 to Kirby et al. An example of a bellows arrangement is shown in U.S. Pat. No. 4,662,668 to Hufford. It is important that when a robot attempts to acquire a part, that the robotic controller receive the signal that the part has either successfully been acquired or not been acquired. In the case of the Hufford device, a proximity sensor is located within the vacuum cup.

U.S. Pat. No. 5,207,467 to Smith teaches a vacuum pick-up device which employs a visual indicator for determining the present or absence of a component on the end of the vacuum pick-up device. A monitor is provided which has a transparent body portion and air flow passages therethrough. An indicator is provided for each vacuum pick-up device and is contained within the air flow passageway for that particular vacuum pick-up device. The position of the indicators within the flow passages is dependent upon the presence or absence of a component on the end of the vacuum pick-up device.

U.S. Pat. No. 5,102,114 to Suda teaches a vacuum pick-up type device wherein suction cups are used to engage sheets of glass. A pressure switch is electrically connected to the robot to supply electrical signals representative of attachment and detachment of the suction cup to the glass. The pressure switch which is a form of pressure sensor is provided in the vacuum supply line to the suction cup. The pressure switch is switched on when the pressure in the supply line is lower than a predetermined value and switched off when the pressure in the supply line is higher than a predetermined value.

U.S. Pat. No. 5,064,234 to Marozsan et al teaches a vacuum pick-up device for use in automated and/or robotic assembly specifically for use in securing electrically conductive components. The device employs an electric conducted sensor for detected the presence of the electrically conductive component at the vacuum nozzle.

U.S. Pat. No. 4,657,470 to Clarke et al teaches a robotic end effector which includes a vacuum-operated quill for picking up integrated circuits. The end effector includes a tactile sensor. This sensor permits sensing of contact between either the integrated circuits being positioned and the adhesive layer on the circuit board or contact between the integrated circuit and the circuit board.

The second principal way in which robotic arms acquire parts or components is through gripping action. Typically, a pair of fingers are operated by a robot such that they are movable toward and away from each other such that the fingers can be manipulated to hold a component therebetween. This type of arrangement is taught in U.S. Pat. No. 5,671,962 to Otsuka et al. The Otsuka device employs a work-detector sensor attached to one of the pair of fingers. The robot controller receives a signal from the work-detector sensor to indicate whether or not a work piece exists between the fingers.

In robotic operations it is often necessary to change end effectors for acquisition of different types of components and, particularly, to change the type of parts acquisition tool being used. That is, in one operation the robot may be employing a vacuum acquisition end effector. In another operation the robot may need to employ a finger gripping-type tool. The prior art fails to teach an end effector system which can be used to both acquire parts by vacuum and by finger gripping.

SUMMARY OF THE INVENTION

It is, therefore, an object of the present invention to provide an end effector configuration which would allow the end effector to be used as a vacuum type pick-up as well as a finger type gripper.

Another object of the present invention is to provide an end effector system in which a vacuum sensor is used to determine whether a part has been acquired regardless of whether acquisition is by means of vacuum pick-up or by means of gripping with fingers.

Briefly stated, the foregoing and numerous other features, objects and advantages of the present invention will become readily apparent upon a reading of the detailed description, claims and drawings set forth herein. These features, objects and advantages are accomplished by providing a vacuum type end effector at the end of fingers adapted to be used for robotic tooling applications. Each vacuum type end effector includes a flexible bellows member on the end thereof such that it can be used for vacuum acquisition. Extending down from each finger to reside adjacent a respective bellows is a pinch member. Through robotic control of the movement of the fingers, finger gripping can be accomplished to grip an object between the two bellows using the pinch members for lateral support. As the part is captured between the two bellows, each bellows is compressed against its respective pinch member such that the part may also be engaged by the pinch members. In such manner, the bellows are at least partially collapsed such that a vacuum sensor located in the vacuum supply line to the bellows registers that a vacuum is present and, thus, a part has been acquired. That same vacuum sensor allows the robot to know when a part has been acquired by the bellows in the typical vacuum-type pick-up arrangement.

DETAILED DESCRIPTION OF THE INVENTION

Figure 1:
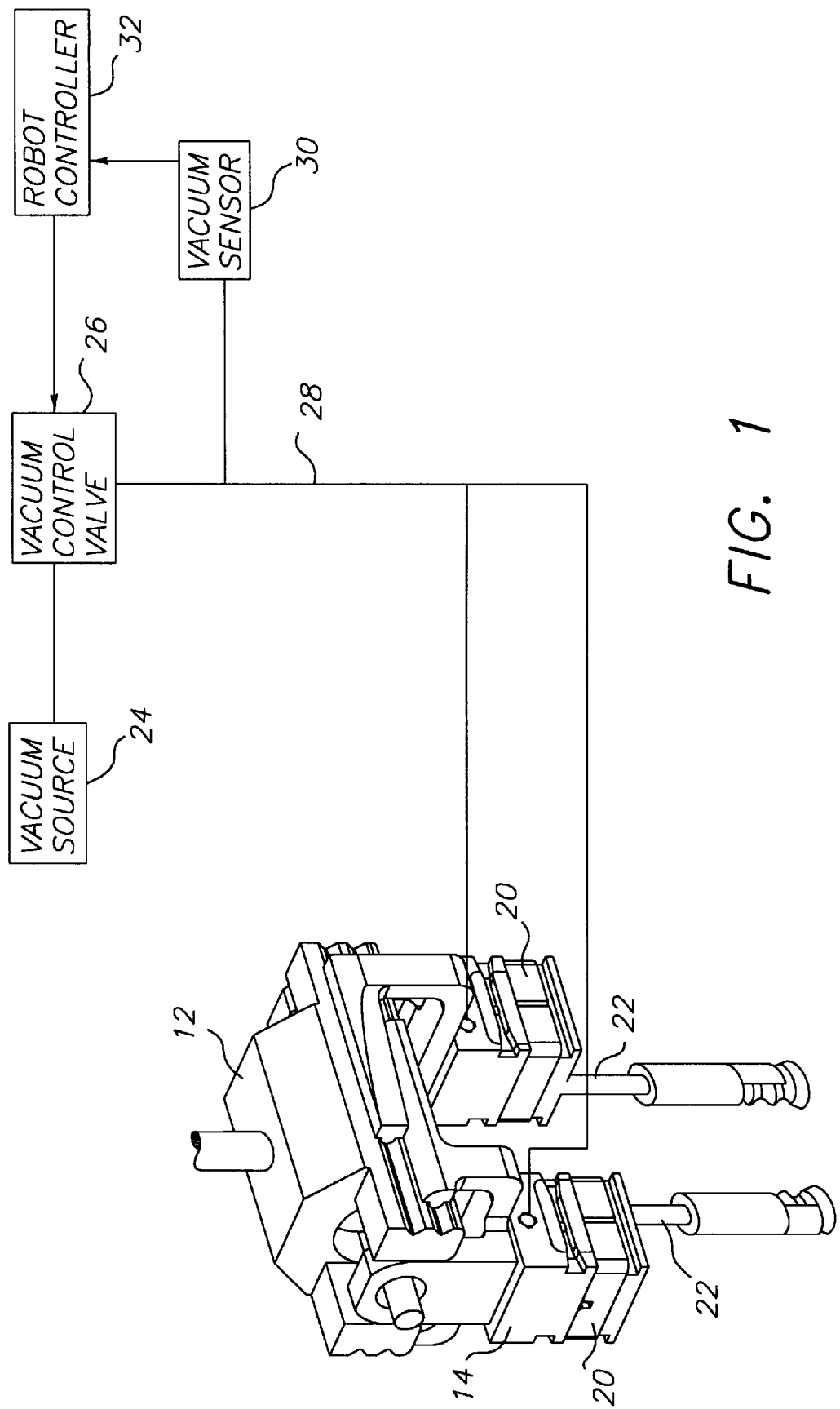
FIG. 1 is a perspective view of the tool interface portion of a robotic arm with a robot controller, vacuum source and vacuum controls depicted schematically.

Turning first to FIG. 1, there is shown a perspective view of a tool interface portion 12 of robotic arm (not shown). Attached to tool interface portion 12 is a tool attachment block 14 which is divided into two sections such that through operation of the robotic arm, the two sections can be moved toward and away from one another. Tool interface portion 12 is preferably the tool interface disclosed in U.S. Pat. No. 5,884,951 entitled, "*Apparatus and Method Having Short Stroke Arcuate Motion for Grasping Objects*" and U.S. patent application Ser. No. 08/865,796 entitled, "Apparatus and Method Having Short Stroke Linear Motion for Grasping Objects" both filed on May 30, 1997, which are hereby incorporated herein by reference. Such tool interfaces may be used in conjunction with a robot such as the Robot World™ as manufactured by Yaskawa Electric of America located in Cypress, Calif. It should be recognized that other tool interfaces capable of moving fingers toward and away from one another for grasping are known in the art and can be used in conjunction with the present invention.

Attached to tool attachment block 14 is bifurcated tool 20. The robotic arm can move the two halves of the bifurcated tool toward or away from each other. One method of attaching tool 20 to tool attachment block 14 is described in U.S. patent application Ser. No. 09/048,441 entitled, "Tool Attachment and Release Device for Robotic Arms" filed on Mar. 26, 1998 and incorporated herein by reference. The method of attachment taught in such application is through the use of permanent magnets contained within the tool attachment block 14. Such application further teaches the use of magnetic shunt bars to reduce the attachment force between the tool 20 and the tool attachment block 14 when it is desired to detach tool 20 from tool attachment block 14. Other methods for attaching tool 20 to a robotic arm are well known in the art and could easily be adapted for use with the present invention.

Extending downward from each of the sections of the bifurcated tool 20 are fingers 22 which will be described in greater detail hereinafter. Vacuum is supplied to fingers 22 from a vacuum source 24 which draws vacuum through a vacuum control valve 26 and vacuum line 28. Connected to vacuum line 28 is a vacuum sensor 30. Vacuum sensor 30 sends a signal to a robot controller 32 which operates the robotic arm and the tool interface portion 12 as well as vacuum control valve 26.

Figure 2:
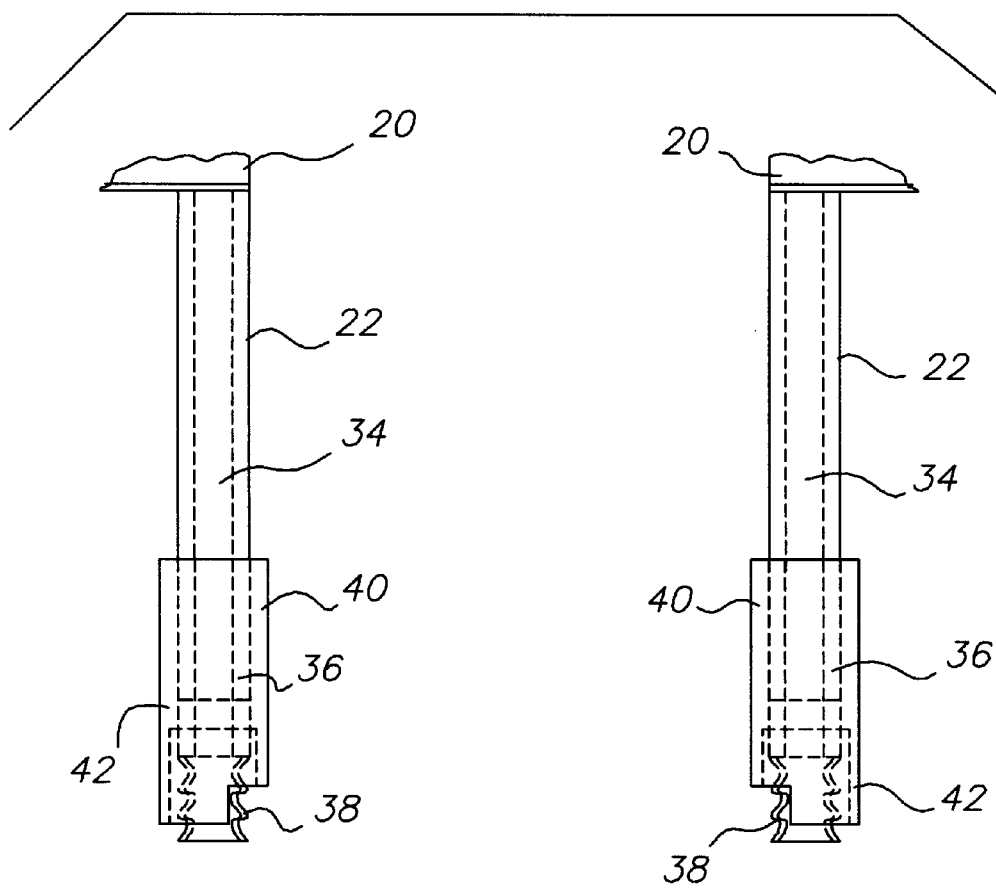
FIG. 2 is an elevational view of two opposing fingers having the end effector system of the present invention mounted thereon.

Turning next to FIG. 2, there is shown a front elevational view of tool opposing fingers 22. Each finger 22 preferably is tubular in configuration such that there is a passageway 34 through which a vacuum can be drawn. Attached to the distal end 36 of each finger 22 is a bellows or suction cup device 38. Bellows or suction cup 38 is made from a flexible and resilient material such as, for example, urethane, and may take the form of a piece of straight, flexible tubing. Affixed to each finger 22 and extending downward therefrom is a pinch member 40, the lower portion 42 of which resides adjacent bellows 38.

Figure 3:
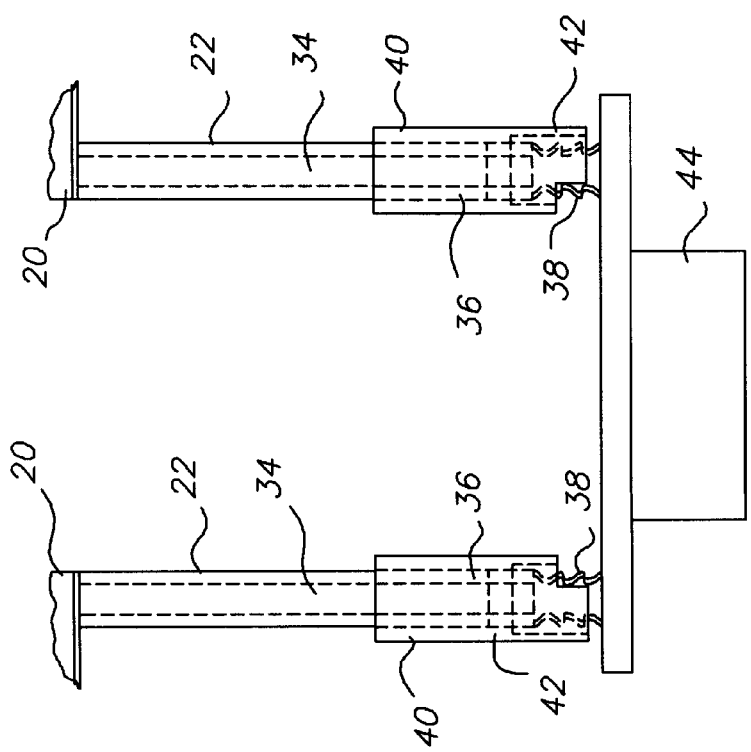
FIG. 3 is an elevational view of the end effector system of the present invention being used to acquire a part by vacuum acquisition.

Looking next at FIG. 3, there is shown two fingers 22 of the end effector system of the present invention being used to acquire a part or object 44 by means of vacuum acquisition. Each bellows 38 is pressed against a flat surface of the part 44 such that through the drawing of a vacuum through bellows 38 and passageways 34 of fingers 22 by vacuum source 24, part 44 is acquired. Vacuum sensor 30 provides a signal to the robot controller 32 when the flow of air through passageway 34 is restricted due to the flat surface of the object blocking the entrance of air through bellows 38 into passageway 34. With the part 44 so acquired, the robot can manipulate and/or deliver the part for work thereon.

Figure 4:
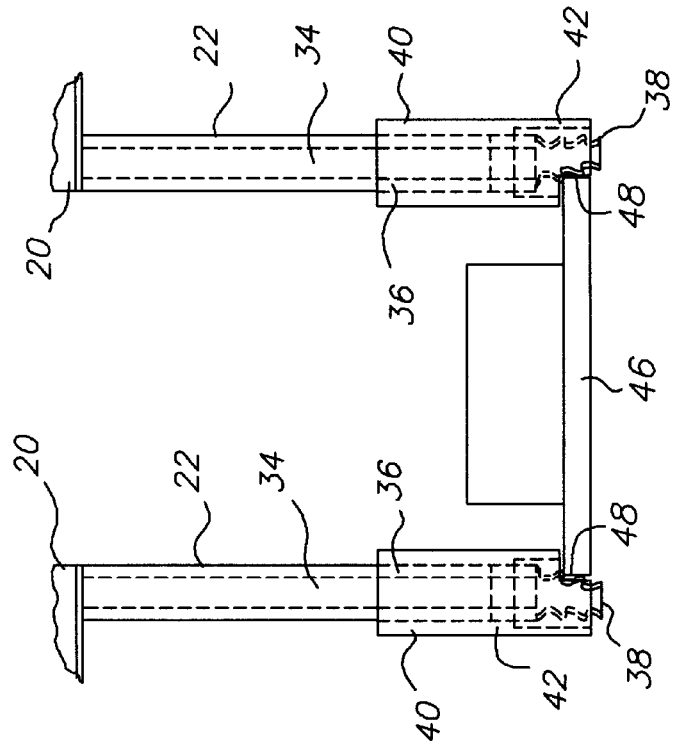
FIG. 4 is an elevational view of the end effector system of the present invention being used to acquire a part by gripping finger action.

Looking next at FIG. 4, there are shown the opposing fingers 22 with pinched members 40, and bellows 38 mounted thereto in this instance being used to acquire a part or object 46 through a gripping action between the bellows 38. When using the device of the present invention as a gripping tool, the pliable bellows 38 compresses at least partially thereby impeding the flow of air through bellows 38 and passageways 34 toward vacuum source 24. This is sensed by vacuum sensor 30 which results in a signal being generated and sent to the robot controller 32 confirming that part 46 has been acquired. Vacuum sensor 30 can also be interrogated during part transfer to the assembly position or after the part has been placed to determine, for example, if the part has been dropped during the transfer operation, or to make sure that the part 46 is no longer being grasped between fingers 22 after part 46 has been delivered to the desired location.

The end effector system of the present invention results in less tool changing by the robot during the assembly of a product. The robot will not need to change between the vacuum type end effector to a gripping finger-type tool and back again. The net effect of less tool changes is an increase in efficiency. More time is spent by the robot actually building the products. Through put is, therefore, increased. It is also important to recognize that a vacuum sensor 30 is being used to determine whether a part 44, 46 is present regardless of whether the system of the present invention is used to acquire the part 44, 46 by means of a vacuum-type pick-up or by a gripping type acquisition. The need for a sensor mounted on the gripping fingers as is typical of gripper finger arrangements, and the accompanying connection points and wires, is eliminated.

Figure 5:
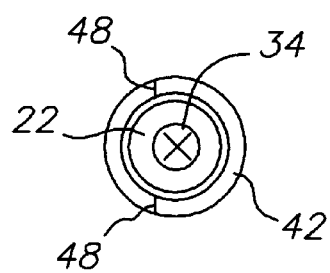
FIG. 5 is a bottom plan view of the finger with a pinch member attached thereto and with the bellows removed therefrom for purposes of clarity.

It should be understood that when using the system of the present invention as a gripper or friction-type acquisition device, bellows 38 need not be completely collapsed. As depicted in FIG. 4, the bellows may only be deflected enough to cause a partial collapse. This partial blocking of the passage through bellows 38 is enough to be sensed by vacuum sensor 30. Bellows 38 do not have to be completely collapsed so as to block all air from entering into passageways 34 in order for the system of the present invention to work correctly. The lower portions 42 of pinch members 40 (see FIG. 5) also include engaging edges 48 which engage part 46 after bellows 38 have partially collapsed. The engaging surfaces 48 of each lower portion 42 may be coated with an urethane or other material to enhance the friction characteristics to ensure that the part 46 will not slip free therefrom.

From the foregoing, it will be seen that this invention is one well adapted to attain all of the ends and objects hereinabove set forth together with other advantages which are apparent and which are inherent to the invention. It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A parts acquisition tool for robotic tooling applications comprising:
    (a) a first tubular finger;
    (b) a second tubular finger, said first and second tubular fingers residing in a generally parallel relationship to one another, said first and second tubular fingers adapted to be moved toward and away from one another;
    (c) a first bellows affixed to a distal end of said first tubular finger;
    (d) a second bellows affixed to a distal end of said second tubular finger;
    (e) a first pinch member extending from said first tubular finger laterally adjacent said first bellows; and
    (f) a second pinch member extending from said second tubular finger laterally adjacent said second bellows, said first and second bellows extending below said first and second pinch members said first and second bellows at least partially compressing against said first and second pinch members when an object is grasped between said first and second bellows.

2. A parts acquisition tool as recited in claim 1 further comprising:
    (a) a first vacuum sensor for sensing a vacuum in said first tubular finger; and
    (b) a second vacuum sensor for sensing a vacuum in said second tubular finger.

3. An end effector system for a parts acquisition tool, said end effector comprising:
    (a) a first tubular finger;
    (b) a first bellows affixed to a distal end of said first tubular finger, said first bellows having an open end;
    (c) a first pinch member extending from said first tubular finger adjacent said first bellows, said first bellows extending below said first pinch member;
    (d) a vacuum sensor for sensing a vacuum in said first tubular finger, said first tubular finger acquiring a part by vacuum acquisition when said open end is moved to a first position to contact a surface of the part, said first tubular finger acquiring the part by gripping when said first tubular finger is moved to a second position where a side of said bellows is caused to engage the part, engagement of the part causing said bellows to collapse against said pinch member.

4. An end effector system as recited in claim 3 further comprising:
    (a) a second tubular finger, said first and second tubular fingers residing in a generally parallel relationship to one another, said first and second tubular fingers adapted to be moved relative to one another;
    (b) a second bellows affixed to a distal end of said second tubular finger, said second bellows having an open end; and
    (c) a second pinch member extending from said second tubular finger adjacent said second bellows, said second bellows extending below said second pinch member; and
    (d) a vacuum sensor for sensing a vacuum in said second tubular finger, said second tubular finger acquiring the part by vacuum acquisition when said open end of said second bellows is moved to a third position to contact a surface of the part, said second tubular finger acquiring the part by gripping when said second tubular finger is moved to a fourth position where a side of said second bellows is caused to engage the part, engagement of the part causing said second bellows to collapse against said second pinch member.

5. An end effector system as recited in claim 4 further comprising:
    means for drawing a vacuum in said second bellows.

6. An end effector system as recited in claim 4 further comprising:
    means for drawing a vacuum in said first and second bellows.

7. An end effector system as recited in claim 3 further comprising:
    means for drawing a vacuum in said first bellows.

8. An end effector system as recited in claim 3 wherein:
    said first pinch member includes a lower portion partially surrounding said first bellows.

9. An end effector system as recited in claim 8 wherein:
    said lower portion includes at least one engaging surface disposed laterally from said bellows to engage the part when said bellows has at least partially collapsed.

10. An end effector system for a parts acquisition tool, said end effector comprising:
    (a) a first finger;
    (b) a first bellows affixed to a distal end of said first finger, said first bellows having an open end;
    (c) a first pinch member extending from said first finger adjacent said first bellows, said first bellows extending below said first pinch member; and
    (d) means for drawing a vacuum in said first bellows, said first finger acquiring a part by vacuum acquisition when said open end is moved to a first position to contact a surface of the part, said first finger acquiring the part by gripping when said first finger is moved to a second position where a side of said bellows is caused to engage the part, engagement of the part causing said bellows to collapse against said pinch member.

11. An end effector system as recited in claim 10 further comprising:
    a vacuum sensor for sensing a vacuum in said first bellows.

* * * * *